Sept. 27, 1955     L. HORNBOSTEL     2,719,065
LUBRICATED BEARING ASSEMBLY
Filed Jan. 11, 1950     2 Sheets-Sheet 1
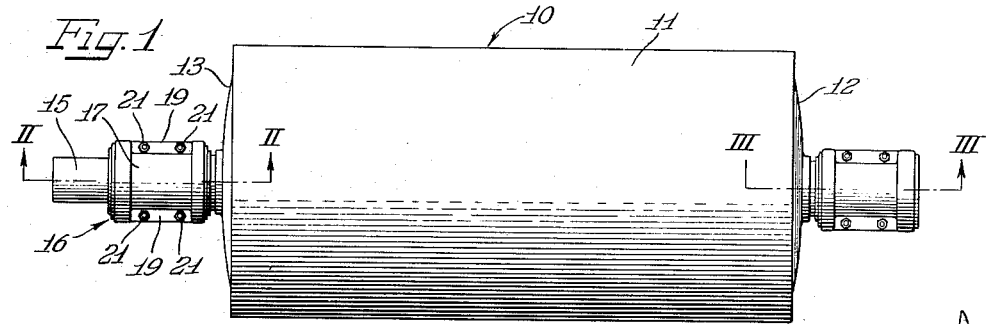
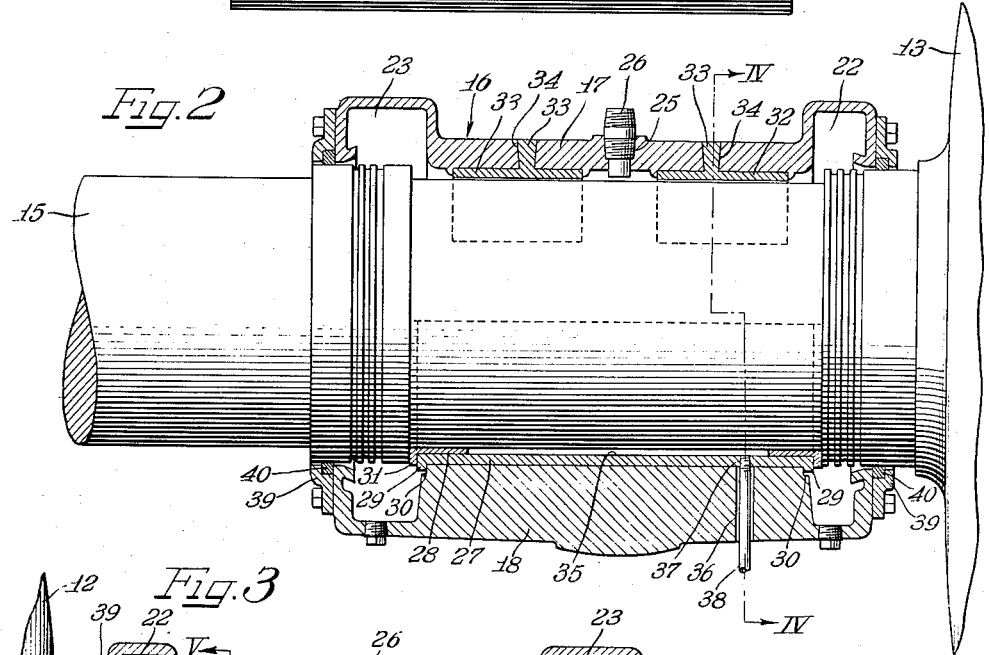
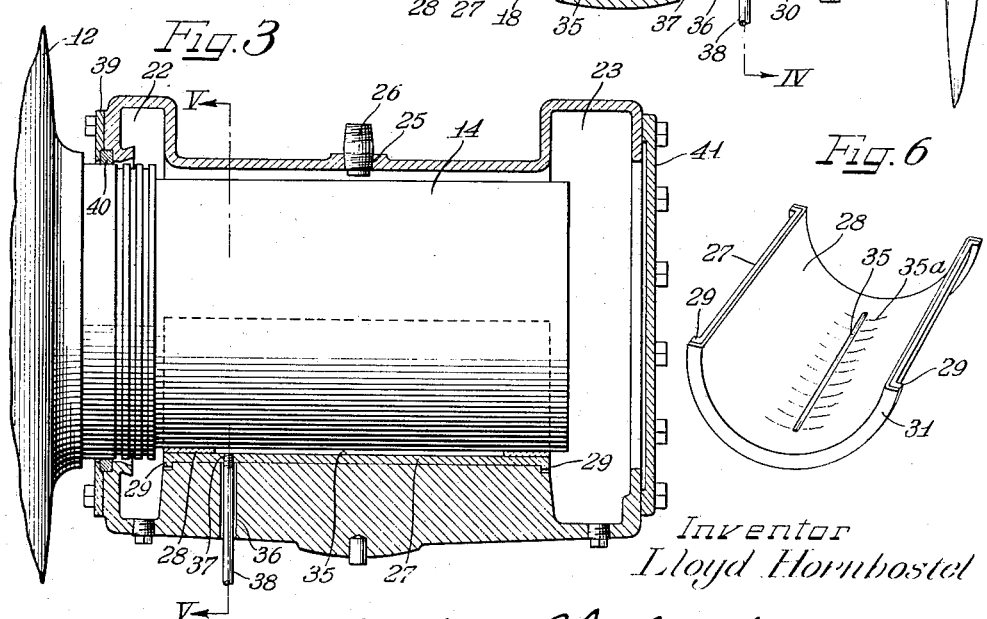
Inventor
Lloyd Hornbostel
by The Firm of Charles W. Hills
Attys Sept. 27, 1955 L. HORNBOSTEL 2,719,065
LUBRICATED BEARING ASSEMBLY
Filed Jan. 11, 1950 2 Sheets-Sheet 2

Inventor
Lloyd Hornbostel
by The Firm of Charlesw Hills Attys

United States Patent Office 2,719,065
Patented Sept. 27, 1955

2,719,065

LUBRICATED BEARING ASSEMBLY

Lloyd Hornbostel, Beloit, Wis., assignor to Beloit Iron Works, Beloit, Wis., a corporation of Wisconsin Application January 11, 1950, Serial No. 138,023

4 Claims. (Cl. 308—122)

The present invention relates to a plain bearing and more particularly to a bearing adapted to journal a rotatable member therein for rotation and provided with means for introducing a lubricant between the bearing surfaces prior to actuation of the rotatable member.

The bearing of the present invention is particularly adapted for use with paper making machinery, as in paper machinery dryer sections. In a dryer section, relatively heavy dryer drums, heated by steam introduced into the interior thereof, are journalled for rotation within plain bearings. During rotation of the dryer drum shaft in a bearing, the shaft does not actually touch the inner bore of the bearing, but rather rests on a very thin film of oil which is constantly being pulled down into the load bearing region by the rotation of the shaft itself within an oil reservoir. Upon the cessation of rotation, the oil film between the bearing surfaces breaks down and metal-to-metal contact results between the bearing and the shaft journalled therein. Upon again actuating the drum for rotation, the metal-to-metal contact requires the exertion of an excessively large torque starting force to again build up the oil film between the bearing surfaces.

The present invention now provides novel means for creating an oil film between relatively movable members of a plain bearing prior to actuation of rotation. In this manner, it has been found by actual test that the starting torque for a given installation will be greatly reduced by a factor of from 10 to 30, depending upon the bearing characteristics, the loading of the bearing, etc.

The improved results and the great reduction of starting torques is obtained by the introduction of a lubricant under pressure between the relatively moving bearing surfaces prior to the initiation of rotational movement. The lubricant under pressure causes either a lifting of the rotatable member from metal-to-metal contact or the distortion of one or more of the bearing members from such contact.

The particular structure of the present invention may suitably include a bearing housing having a liner therein for bearing contact with a rotatable member, such as a shaft. The bearing liner is grooved or slotted to provide a space adapted for the reception of oil or other lubricant under pressure. Oil under pressure introduced into the bearing groove may serve either to lift the rotatable member from engagement with the bearing liner or to deform the bearing liner from engagement with the shaft. In some cases, both of these results may be obtained. In any event, the rotatable member is spaced from the bearing prior to the initiation of rotatable movement thereof and lubricant under pressure is forced into this space to provide an initial oil film which obviates metal-to-metal contact upon initial actuation of rotation.

If a series of relatively spaced plain bearings are employed, a single pressure generating means or pump may serve all of the bearings connected in series. An orifice is provided in the supply line leading to each of the bearings, so that a large portion of the lubricant would not be bypassed to the first of the bearings to break free for rotation.

It is, therefore, an important object of the present invention to provide an improved plain bearing having means for setting up an oil film between relatively moving portions thereof prior to the actuation of movement.

Another important object of the present invention is to provide an improved plain bearing provided with means for supplying lubricant under pressure between relatively movable surfaces prior to the initiation of movement of the surfaces.

It is a further important object of the present invention to provide an improved plain bearing for a shaft or the like, in which lubricant is supplied to the bearing under pressure to space the shaft from its bearing prior to the initiation of movement therebetween, thereby reducing the starting torque necessary for initiating rotation of the shaft.

Still another important object of the present invention is to provide an improved lubrication system for a series of plain bearings including a source of lubricant under pressure, means for supplying lubricant under pressure to each of the bearings, and means for preventing unwarranted excess flow of lubricant to any one of the bearings upon the initiation of movement therein.

Other and further important objects of this invention will be apparent from the disclosures in the specification and the accompanying drawings.

On the drawings:

Figure 1 is a plan view of a dryer drum provided with a pair of bearings of the present invention;

Figure 2 is a sectional view, with parts shown in elevation, taken along the plane II—II of Figure 1;

Figure 3 is a sectional view, with parts shown in elevation, taken along the plane III—III of Figure 1;

Figure 6 is an elevational perspective view of a lining and liner shell section of a bearing of the present invention;

As shown on the drawings:

Figure 4:
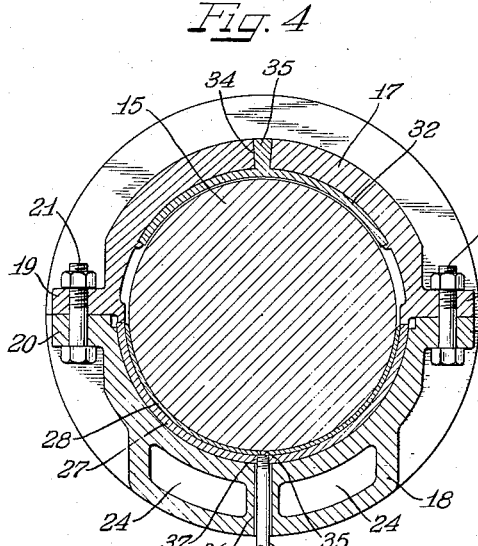
Figure 4 is a sectional view, with parts shown in elevation, taken along the plane IV—IV of Figure 2.

In Figure 1, reference numeral 10 refers generally to a dryer drum such as that conventionally employed in paper making apparatus dryer sections. The drum 10 includes a generally cylindrical hollow shell 11 provided with end closure heads 12 and 13. As shown in Figures 2 and 3, each of the heads 12 and 13 carries a stub-shaft 14 and 15, respectively.

The shaft 15 is journalled in a plain bearing generally indicated as at 16, the bearing 16 including a pair of semi-cylindrical casing halves 17 and 18, provided with outturned ears 19 and 20, respectively, and having registering apertures receiving bolt 21. The ends of each of the casing halves 17 and 18 are peripherally enlarged to provide annular end chambers 22 and 23 surrounding the shaft 15 and connected by a pair of axially extending passages 24 formed in the lower end of the casing section 18. The enlarged chambers 22 and 23 serve as a reservoir for the reception of lubricant with access of lubricant to the chambers being provided by means of an aperture 25 centrally formed in the upper casing section 17 and closed by suitable means, as by plug 26.

Inasmuch as the casing sections 17 and 18 are formed of cast iron and the shaft 15 is preferably formed from hardened steel, it is desirable that a lining of bearing metal, such as Babbitt metal or the like be interposed between the casing and the shaft. This liner includes an outer liner shell 27 which is semi-cylindrical in shape to surround the lower half of the central portion of shaft 15 confined within the casing. The liner shell 27 is in turn lined with a bearing metal section 28 of substantially the same size and contour, as best shown in Figure 6 of the drawing. The shell 27 is provided with terminal radially outwardly directed end flanges 29 which are received by corresponding shoulders 30 formed at the inner periphery of the lower casing section 18, and the liner section 28 is provided with corresponding outturned terminal flanges 31 which fit over the flanges 29 of the liner shell.

The upper casing section 17 is also provided with a lining formed of a bearing metal, the lining in this section taking the form of a pair of axially spaced arcuate sections 32 which are secured within the casing section by means of tapered integrally formed plugs 33 cast in corresponding tapered holes 34 in the casing section.

Upon assembly, the casing sections and liner assemblies serve to journal the shaft 15 therein for rotation. When the shaft rests on the lining section 27, the upper liner sections 32 are slightly spaced from, while effectively guiding the periphery of the shaft.

As best shown in Figures 2, 4 and 6, the liner section 28 is grooved as at 35, along its central, axially extending portion, the groove 35 forming a slot radially through the liner but terminating short of the axially spaced ends of the liner section. The casing section 18 is radially apertured as at 36, and the liner shell 27 is provided with a corresponding radial aperture 37 in registry with the aperture 36. A pipe section 38 is threaded into the aperture 37 and extends through the registering aperture 36 for communication with the source of lubricant under pressure. Thus, it will be appreciated that fluid under pressure may be introduced through the line 38 into the groove 35 formed in the liner section 28.

Lubricant introduced into the groove 35, and also that lubricant within the reservoir provided by chambers 22 and 23 and the passages 24, respectively, is sealed within the interior of the bearing casing 16 by the provision of annular end plates 39 secured to opposed ends of the casing 16 and carrying about their inner peripheries a seal ring 40 extending into sealing engagement with corresponding portions of the shaft 15.

Figure 5:
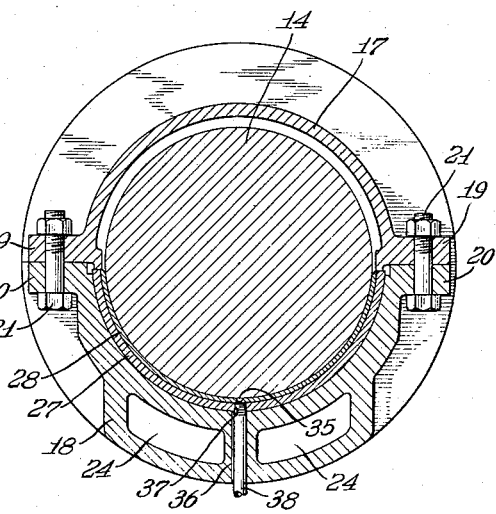
Figure 5 is a sectional view with parts shown in elevation taken along the plane V—V of Figure 3.

The bearing for the shaft 14 illustrated in Figures 3 and 5 is substantially the same as the hereinbefore described in connection with the bearing for the shaft 50. Identical reference numerals refer to identical portions of the bearing for the shaft 14, the major change in this bearing being the elimination of the upper bearing section 32 and the provision of a circular end closure plate 41 to replace one of the annular closure plates 39, since the shaft 14 does not extend completely through the bearing. The elimination of the upper bearing section 32 is possible inasmuch as the stub-shaft 14 is not driven, as is the shaft 15, but rather is merely journalled for free rotation. Therefore, the close journalling of the shaft 14 is not necessary. For the same reason, the liner section 28 of this bearing is not provided with terminal end flanges 31.

Figure 9:
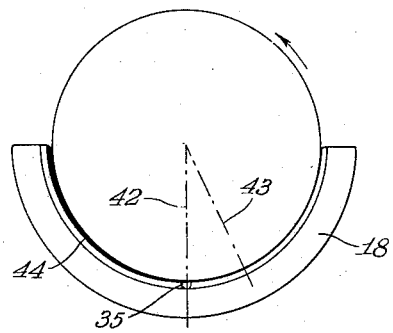
Figure 9 is a diagrammatic view of a bearing of the present invention illustrating the oil film between moving surfaces of a bearing.

The significance of the provision of the groove 35 and of the pipe 38 for supplying lubricant under pressure thereto will be readily appreciated from Figures 6 and 9 of the drawing. In Figure 6, the position of the groove 35 is illustrated together with the lines 35a representing the flow of lubricant under pressure from the groove about the inner periphery of the bearing section 28.

In Figure 9, the line 42 represents that radius of the shaft 15 extending in a true vertical plane. The major force exerted by the weight of the entire roll assembly 10 is exerted in the plane indicated by the line 42 when the roll is at rest. This plane 42 thus defines a static high load zone where the plane meets the bearing supporting the shaft. The groove 35 straddles this plane so that lubricant under pressure is injected into the bearing at the point of greatest load, or in other words, in the static high load zone. The line 43 represents the plane in which the greatest load is imposed upon the bearing during rotation of the drum 10 in the direction indicated by the directional arrow. This plane 43, therefore, defines a dynamic high load zone on the bearing.

Thus, the groove 35 is disposed out of the plane of greatest load during rotation, i. e. the dynamic high load zone, so that there is no weakening of the bearing section 28 in this plane and there is no loss of bearing contact at the point of greatest load during rotation.

In addition, Figure 9 diagrammatically shows the oil film 44. During rotation of the bearing in the journal, oil will be carried peripherally by the shaft, and this oil will be wedged between the shaft and the bearing section 18. This wedging action will result in a slight clearance between the shaft and the bearing casing as illustrated in Figure 9. The groove 35, being displaced peripherally from the plane 43, lies in an area at which the oil wedge is appreciable in thickness, thereby again reducing wear upon the grooved section of the bearing liner 28. Since the bearing liner is free from radially extending grooves the wedged oil layer is not relieved and continually supplies oil to the loaded section.

It is to be understood that in the embodiment of the invention shown in Figures 1–5, lubricant under pressure entering the pipe 38 is effective to actually lift the shaft 14 or 15, as the case may be, from contact with the bearing sleeve. It will be noted in Figures 2 and 4 that the upper bearing section 32 is slightly spaced radially from the periphery of the shaft 14 to allow for this lifting of the shaft. Upon the lifting of the shaft, an oil film is rapidly formed between the shaft and the bearing and rotation may readily occur with the shaft floating in this oil film. Thus, the starting torque necessary to initiate the rotation of the shaft is greatly reduced and the advantages hereinbefore described are obtained.

The introduction of lubricant under pressure is necessary only during starting of rotation, since the oil film formed on rotation of the shaft is sufficient to lubricate the bearing during running. However, if desired for certain installations, the lubricant may be continuously injected through line 38 to afford constant, positive lubrication. The elongated arcuate lubrication area is sufficient to force free a large heavy drum or roller by the use of only nominal pressures in the neighborhood of 300 pounds per square inch.

Figure 7:
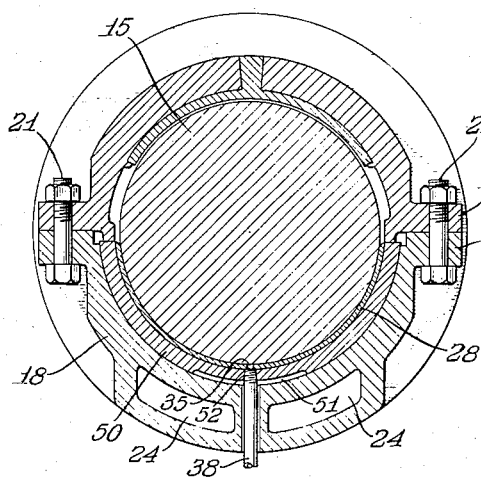
Figure 7 is a sectional view similar to Figure 4 illustrating a modified form of bearing of the present invention.
Figure 8:
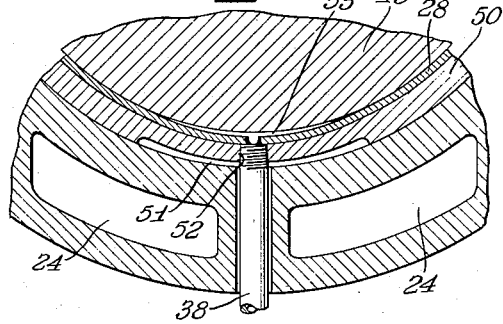
Figure 8 is an enlarged fragmentary sectional view similar to Figure 7, illustrating distortion of the modified form of bearing under pressure.

In that embodiment of the invention illustrated in Figures 7 and 8, the provision of an initial oil film between the relatively moving surfaces of the shaft 15 and the bearing sleeve 28 is accommodated by an actual deflection of the outer bearing member 27, either alone or in conjunction with the lifting of the shaft within the bearing. In this embodiment of the bearing of the present invention, identical reference numerals hereinbefore employed refer to identical portions of the apparatus.

The chief difference between the embodiment of Figures 7 and 8 and that of Figures 1–5, inclusive, resides in the bearing shell 50, which is seated in the lower bearing half 18 to carry the inner bearing shell 28. The bearing shell 50 is recessed as at 51 on its outer periphery, the recess extending peripherally from the threaded aperture 52 receiving the lubricant supply line 38, and the recess 51 is substantially coextensive in axial length with the groove 35 of the inner bearing member 28.

It will be seen from Figure 8, that, upon the introduction of lubricant under pressure through the supply pipe 38 into the interior of the groove 35, this pressure will deform the bearing liner 50 radially outwardly from the shaft to provide a space 53 between the bearing inner member 28 and the shaft 15. Lubricant thus being introduced into space 53 is present at the point of maximum resistance to the starting torque imposed on the shaft, so that effective lubrication is obtained.

It will also be noted that the pipe 38 is carried directly by the bearing shell 50 for movement therewith so that there is no question of stripping the threads of the pipe from the soft metal inner liner 28 during deflection of the liner.

Figure 10:
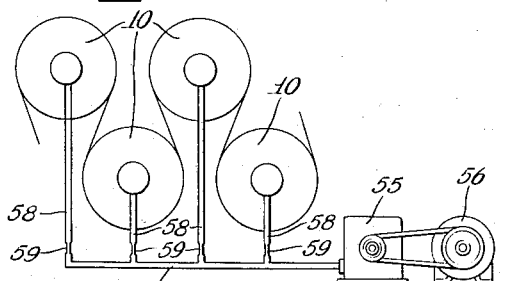
Figure 10 is a schematic view illustrating the adaption of a plurality of bearings of the present invention for use with a single source of lubricant under pressure.

In Figure 10 of the drawings, there is shown a lubrication system whereby lubricant under pressure may be furnished to a plurality of plain bearings journalling a plurality of dryer drums 10 for rotation. Lubricant under pressure is supplied by a gear-type or other pump 55 driven by suitable means, as by an electric motor 56 and supplying lubricant under pressure to a header pipe 57. A branch pipe 58 is provided for supplying lubricant under pressure from the header pipe 57 to each of the bearings journalling the drum shafts. A restricted orifice 59 is provided in each of the pipes 58 immediately adjacent the header pipe 57, so that a large pressure drop occurs across the orifice 59 to prevent an excess lubricant flow to any single bearing which breaks free for rotation. In this manner, it is possible to prevent the feed of a considerable portion of the capacity of the pump 55 to the first bearing of the group to break free, thus resulting in the lowering of oil pressure available at the other bearings to successively break them free.

It will be understood that modifications and variations may be effected without departing from the scope of the novel concepts of the present invention.

I claim as my invention:

1. A plain bearing assembly comprising a shaft or the like, an enclosed, generally cylindrical casing receiving a portion of the shaft, an elongated arcuate liner shell nested in said casing and having an elongated arcuate recess in its outer periphery, a bearing liner on the inner periphery of said liner shell and having an elongated groove therein coextensive in length with but separate from and narrower in width than said recess, and a lubricant conduit carried by said liner shell and communicating with said groove for introducing fluid under pressure between the liner and said shaft to thereby cause deformation of the recessed portion of said liner shell radially from the shaft to accommodate the introduction of lubricant between said liner and the shaft.

2. In combination, a shaft, a casing enclosing a portion of said shaft, a bearing lining disposed in said casing for partially enclosing a peripheral portion of said shaft and in contact therewith, said lining having at its inner periphery a groove communicating with said shaft and at its outer periphery an arcuate recessed portion aligned with and separated from said groove, and a lubricant conduit communicating with said groove and with a source of lubricant under pressure, said conduit passing through and separated from said recessed portion so that the introduction of lubricant under pressure into said groove distorts said lining into said recess to radially space said lining from said shaft, thereby introducing lubricant under pressure between said shaft and said lining to facilitate initial rotational actuation of said shaft.

3. A plain bearing assembly comprising a shaft or the like, a casing enclosing a portion of the shaft, a bearing lining disposed in said casing partially enclosing a peripheral portion of the shaft and in contact therewith, said lining having at its inner periphery a groove communicating with the shaft and at its outer periphery an arcuate recessed portion aligned with said groove, and a lubricant conduit communicating with said groove and with a source of lubricant under pressure, the introduction of lubricant under pressure into said groove distorting said lining into said recess to radially space said lining from the shaft, thereby introducing lubricant under pressure between the shaft and said lining to facilitate initial rotational actuation of the shaft.

4. A plain bearing assembly comprising a shaft, a casing section enclosing a portion of said shaft, a bearing liner disposed in said casing contacting said shaft and having an elongated groove underlying said shaft and an opposing recess therebeneath, and a lubricant conduit extending inwardly of said casing communicating with said groove and a source of lubricant under pressure, the introduction of lubricant under pressure deforming the grooved portion of said liner into said recess to admit lubricant between said shaft and said liner.

References Cited in the file of this patent

UNITED STATES PATENTS

| Number | Name | Date |
|---|---|---|
| 132,395 | Gross | Oct. 22, 1872 |
| 585,445 | Lumb | June 29, 1897 |
| 603,260 | Cook | May 3, 1898 |
| 1,121,908 | Elders | Dec. 22, 1914 |
| 1,334,090 | Gruender | Mar. 16, 1920 |
| 2,000,913 | Bijur | May 14, 1935 |
| 2,062,250 | Moller | Nov. 24, 1936 |
| 2,076,977 | Bush | Apr. 13, 1937 |
| 2,145,245 | Bijur | Jan. 31, 1939 |
| 2,173,225 | Berry | Sept. 19, 1939 |
| 2,520,129 | Dall | Aug. 29, 1950 |
| 2,539,072 | Gordon | Jan. 23, 1951 |

FOREIGN PATENTS

| Number | Country | Date |
|---|---|---|
| 216,324 | Great Britain | May 29, 1924 |
| 379,062 | Great Britain | Aug. 25, 1932 |
| 722,148 | France | Mar. 11, 1932 |